(12) United States Patent
Tsukamoto et al.

(10) Patent No.: US 8,373,320 B2
(45) Date of Patent: Feb. 12, 2013

(54) STATOR, MOTOR, AND COMPRESSOR

(75) Inventors: Satoshi Tsukamoto, Kusatsu (JP); Hiroki Shirasaka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 224 days.

(21) Appl. No.: 12/934,480

(22) PCT Filed: Mar. 11, 2009

(86) PCT No.: PCT/JP2009/054671
§ 371 (c)(1),
(2), (4) Date: Sep. 24, 2010

(87) PCT Pub. No.: WO2009/119320
PCT Pub. Date: Oct. 1, 2009

(65) Prior Publication Data
US 2011/0014068 A1 Jan. 20, 2011

(30) Foreign Application Priority Data
Mar. 28, 2008 (JP) ................. 2008-085742

(51) Int. Cl.
*H02K 3/28* (2006.01)
*H02K 3/52* (2006.01)
(52) U.S. Cl. .......................... 310/71; 310/194
(58) Field of Classification Search .............. 310/194, 310/71, 215
See application file for complete search history.

(56) References Cited

U.S. PATENT DOCUMENTS

| 6,595,760 | B2 * | 7/2003 | Shida et al. ................. 417/410.1 |
| 7,569,964 | B2 * | 8/2009 | Ijima .............................. 310/194 |
| 7,626,303 | B2 * | 12/2009 | Watanabe et al. ...... 310/216.095 |
| 7,701,102 | B2 | 4/2010 | Amano |
| 2009/0026870 | A1 * | 1/2009 | Hoshino et al. ................ 310/194 |

FOREIGN PATENT DOCUMENTS

| JP | 2003-348783 A | 12/2003 |
| JP | 3824001 B2 | 7/2006 |
| JP | 2007-110848 A | 4/2007 |

OTHER PUBLICATIONS

International Search Report of corresponding PCT Application No. PCT/JP2009/054671.

* cited by examiner

*Primary Examiner* — Burton Mullins
(74) *Attorney, Agent, or Firm* — Global IP Counselors

(57) ABSTRACT

A stator for a motor of a compressor includes a stator core, an insulator fitted on an axial end face of the stator core, and coils wound around the stator core and the insulator. The insulator has an annular portion, a plurality of circumferentially arranged tooth portions projecting radially inwardly from an inner peripheral surface of the annular portion, and a cylindrical-shaped wall section erected on an axial end face of the annular portion. The coils include crossover wires routed on an outer peripheral surface of the wall section of the insulator so as to extend obliquely relative to a plane orthogonal to an axis of the stator, as viewed in a direction orthogonal to the axis.

6 Claims, 9 Drawing Sheets

STATOR, MOTOR, AND COMPRESSOR

CROSS-REFERENCE TO RELATED APPLICATIONS

This U.S. National stage application claims priority under 35 U.S.C. §119(a) to Japanese Patent Application No. 2008-085742, filed in Japan on Mar. 28, 2008, the entire contents of which are hereby incorporated herein by reference.

TECHNICAL FIELD

The present invention relates to a stator, a motor and a compressor.

BACKGROUND ART

Among those conventionally available is a stator which includes a stator core, an insulator fitted on an axial end face of the stator core, and coils wound around the stator core and the insulator (see JP 3824001 B2).

The insulator has an annular portion, a plurality of tooth portions projecting radially inward from an inner peripheral surface of the annular portion and arrayed circumferentially, and a cylindrical wall section erected on an axial end face of the annular portion.

The crossover wires of the coils are set so as to extend on an outer peripheral surface of the wall section in a direction (horizontal direction) parallel to a plane orthogonal to an axis of the stator as it is viewed in the direction orthogonal to the axis.

SUMMARY

Technical Problem

However, in the above-described conventional stator, the crossover wires of the coils are routed so as to extend on an outer peripheral surface of the wall section in a direction parallel to an orthogonal-to-axis directed plane as it is viewed in the orthogonal-to-axis direction. Therefore, in a case where the stator core has a larger number of slot portions, when a plurality of sets of neighboring slot portions are simultaneously wound with the coils, there is a problem that routing the plurality of crossover wires on the wall section in a mutual-contact-avoiding manner involves an increase in the height of the crossover wires from the annular portion (namely, a stator-core end face). As a result, it is necessary to increase the axial height of the wall section.

Accordingly, an object of the present invention is to provide a stator which allows the height of the wall section of the insulator to be reduced, a motor using the stator, and a compressor using the motor.

Solution to Problem

In order to solve the problem, a stator according to an aspect of the present invention comprises:
a stator core;
an insulator fitted on an axial end face of the stator core; and
coils wound around the stator core and the insulator,
wherein the insulator comprises:
an annular portion;
a plurality of tooth portions which are projected radially inwardly from an inner peripheral surface of the annular portion and which are circumferentially arrayed; and
a cylindrical-shaped wall section erected on an axial end face of the annular portion, and
wherein crossover wires of the coils are routed on an outer peripheral surface of the wall section so as to extend obliquely to a plane orthogonal to an axis of the stator, as viewed in a direction orthogonal to the axis.

It is noted here that the term "crossover wires" refers to interconnecting wires for connecting individual phases of the coils.

With such a stator, the crossover wires of the coils are routed on the outer peripheral surface of the wall section of the insulator so as to extend obliquely to the plane orthogonal to the axis of the stator ("orthogonal-to-axis plane") as viewed in the direction orthogonal to the axis ("orthogonal-to-axis direction"). Therefore, during the winding of the coils simultaneously on a plurality of sets of slot portions, with each set consisting of neighboring slot portions, when a plurality of crossover wires are routed on the wall section so as not to make contact with one another, the height of the crossover wires from the annular portion (or an end face of the stator core) can be made lower. Thus, the axial height of the wall section is able to be reduced, so that the stator is able to be made smaller-sized.

In accordance with one aspect of the present invention, the wall section has a plurality of stages in a height direction, and a pull-out portion that is a portion of a crossover wire pulled out from an inner surface to an outer surface of the wall section and a pull-in portion that is a portion of the crossover wire pulled in from the outer surface to the inner surface of the wall section, are positioned at mutually neighboring stages of the wall section.

It is noted here that an interval between neighboring ones of the stages is not less than the wire diameter of the crossover wires.

With such a stator, the pull-out portion and the pull-in portion of a crossover wire are positioned at mutually neighboring stages, so that the axial height of the wall section can be reduced even more.

A motor according to another aspect of the present invention comprises a rotor and the above-described stator of the invention which is placed so as to surround an outer peripheral side of the rotor.

With such a motor, due to the inclusion of the above-described stator which is able to be made smaller-sized, the motor is also able to be made smaller-sized.

A compressor according to another aspect of the present invention comprises a closed, or hermetic container, a compression mechanism placed within the closed container, and the above-described motor of the invention, which is placed within the closed container and which drives the compression mechanism.

With such a compressor, due to the inclusion of the above-described motor which is able to be made smaller-sized, the compressor is also able to be made smaller-sized. That is, the distance between the motor and the compression mechanism can be made smaller, so that the overall height of the compressor can be made lower. As a result, the rigidity of the compressor can be improved, so that operating noise of the compressor can be reduced.

Advantageous Effects of Invention

With a stator in accordance with one or more of the above aspects, the crossover wires of the coils are routed on the outer peripheral surface of the wall section of the insulator so as to extend obliquely to the "orthogonal-to-axis plane", as viewed in the orthogonal-to-axis direction". Therefore, the axial height of the wall section is able to be reduced, so that the stator is able to be made smaller-sized.

With a motor in accordance with one or more of the above aspects, due to the inclusion of the stator which is able to be made smaller-sized, the motor is also able to be made smaller-sized.

With a compressor in accordance with one or more of the above aspects, due to the inclusion of the motor which is able to be made smaller-sized, the compressor is also able to be made smaller-sized.

DESCRIPTION OF EMBODIMENTS

Hereinbelow, the present invention will be described in detail by way of embodiments thereof illustrated in the accompanying drawings.

(First Embodiment)

Figure 1:
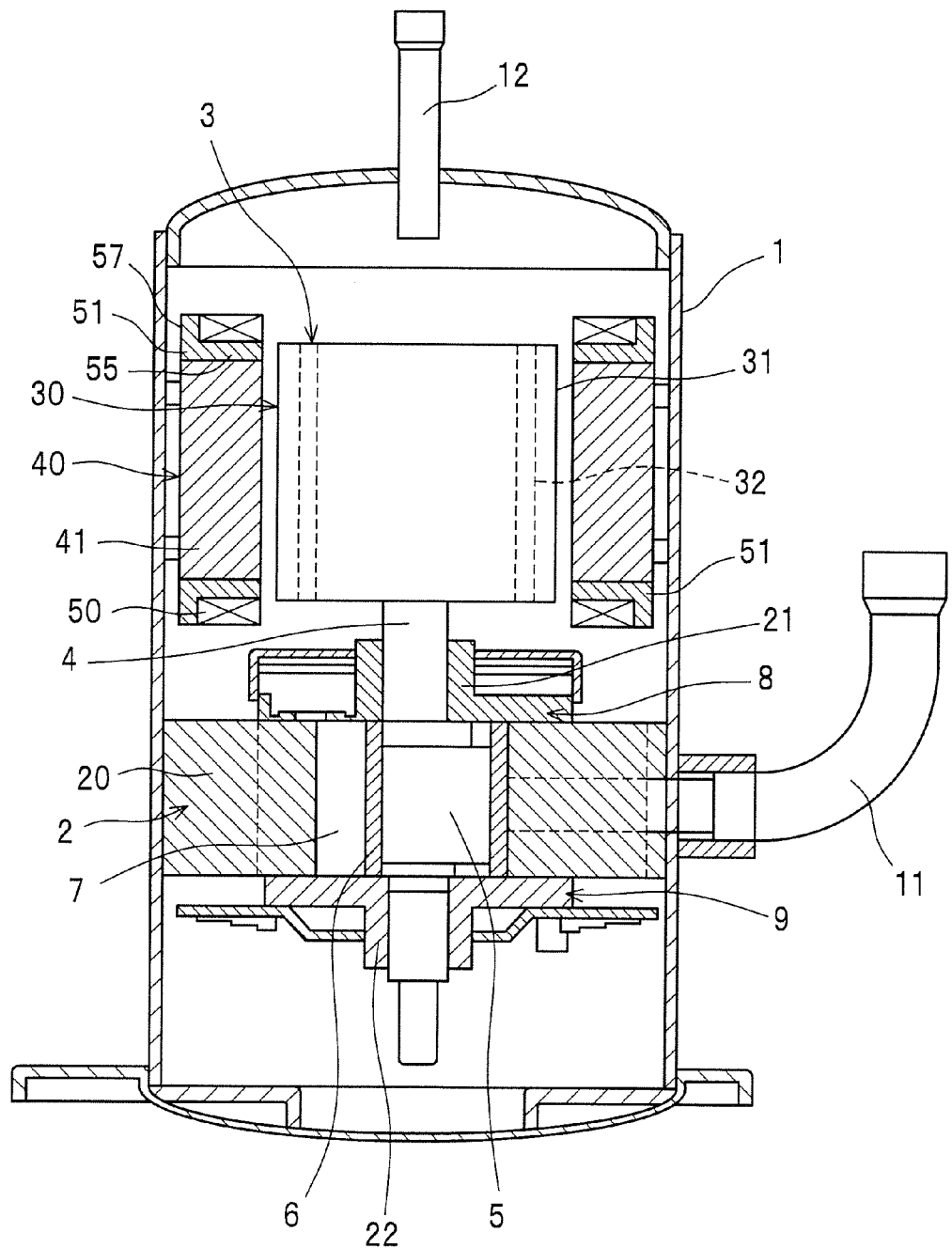
FIG. 1 is a longitudinal sectional view showing an embodiment of a compressor of the present invention.

FIG. 1 is a longitudinal sectional view showing an embodiment of a compressor of the invention. The compressor includes a closed, or hermetic container 1, and a compression mechanism 2 and a motor both placed within the closed container 1. This compressor is a rotary compressor.

An intake pipe 11 is connected to a lower side portion of the closed container 1, while a discharge pipe 12 is connected to an upper side of the closed container 1. A refrigerant supplied through the intake pipe 11 is led to the intake side of the compression mechanism 2. This refrigerant, being carbon dioxide, may also be R410A, R22 or the like.

The motor 3, which is placed upward of the compression mechanism 2, drives the compression mechanism 2 via a rotating shaft 4. The motor 3 is placed in a high-pressure region within the closed container 1 which is to be filled with the high-pressure refrigerant discharged from the compression mechanism 2.

The compression mechanism 2 includes a cylindrical-shaped body 20, and upper end portion 8 and lower end portion 9 fitted to the body 20 at upper and lower opening ends, respectively,.

The rotating shaft 4 is inserted inside the body through the upper end portion 8 and the lower end portion 9. The rotating shaft 4 is rotatably supported by a bearing 21 provided on the upper end portion 8 of the compression mechanism 2 and a bearing 22 provided on the lower end portion 9 of the compression mechanism 2.

A crankpin 5 is provided on the rotating shaft 4 within the body 20. A compression chamber 7 defined between a piston 6, which is fitted to and driven by the crankpin 5, and a cylinder corresponding to the piston 6 works for doing compression. The piston 6 rotates in an eccentric state or revolves to make the compression chamber 7 varied in capacity.

Figure 2:
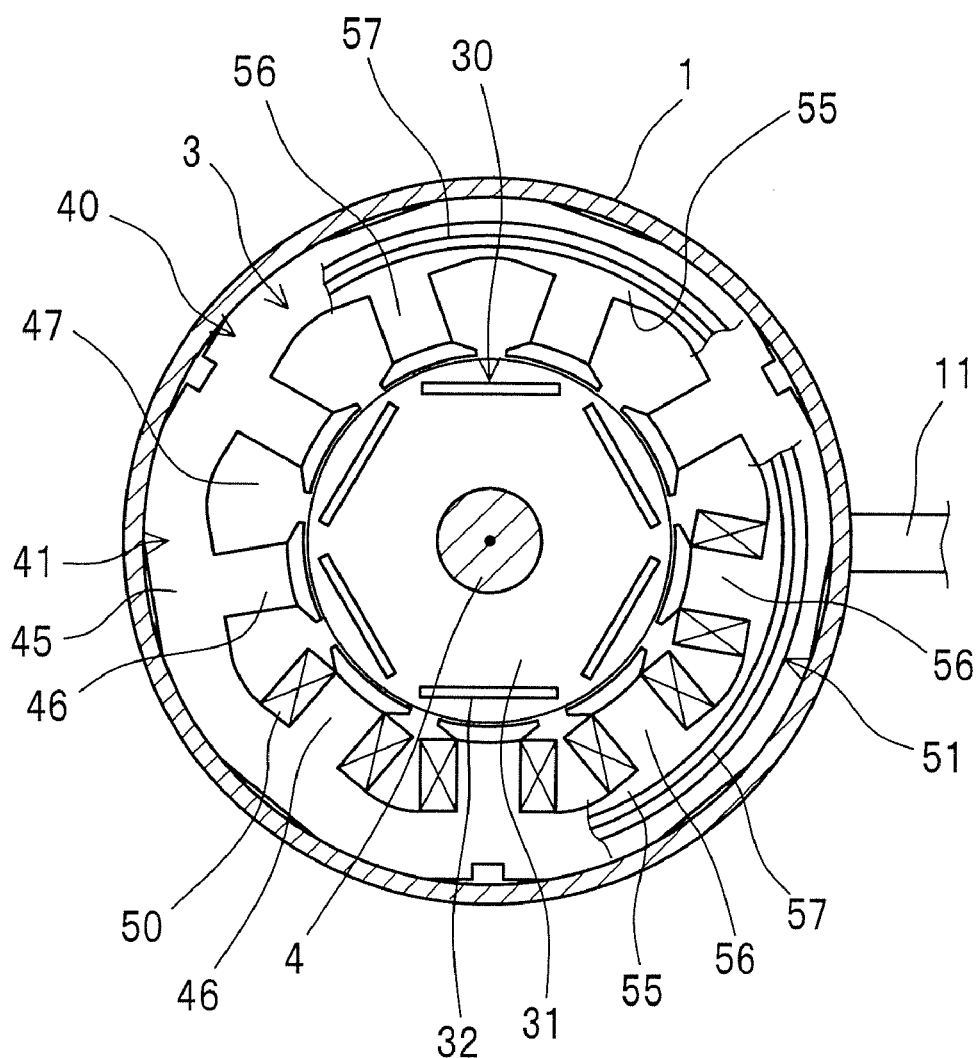
FIG. 2 is a cross-sectional view of a motor of the compressor and its vicinity.

As shown in FIGS. 1 and 2, the motor 3 has a cylindrical-shaped rotor 30 fixed to the rotating shaft 4, and a stator 40 placed so as to surround the outer peripheral side of the rotor 30. The stator 40 is placed radially outside the rotor 30 with an air gap therebetween. That is, the motor 3 is an inner rotor type motor.

The rotor 30 has a rotor core 31, and six magnets axially buried and circumferentially arrayed in the rotor core 31.

The rotor core 31 is cylindrical shaped and made of stacked electromagnetic steel sheets as an example. The rotating shaft 4 is set in a central hole of the rotor core 31. The magnets 32 are flat-shaped permanent magnets.

The stator 40 has a stator core 41, insulators 51 fitted on axial both end faces of the stator core 41, and coils 50 wound around the stator core 41 and the insulators 51. It is noted that the coils 50 and the insulator 51 are partly omitted in the drawing of FIG. 2.

The stator core 41, which may be formed of stacked electromagnetic steel sheets as an example, has a cylindrical portion 45, and nine tooth portions 46 which are radially inwardly projected from an inner peripheral surface of the cylindrical portion 45 and which are circumferentially arrayed.

The stator core 41 has nine slot portions 47 opened on the inner peripheral side and circumferentially arrayed. That is, these slot portions 47 are defined between neighboring, or adjacent, tooth portions 46.

Each coil 50 is wound not over a plurality of tooth portions 46 but on the individual tooth portions 46, hence a concentrated winding. The motor 3 is of a so-called 6-pole, 9-slot type. with electromagnetic force generated in the stator 40 effected by a current flow through the coil 50, the rotor 30 is rotated together with the rotating shaft 4.

The insulators 51 are sandwiched and held between the stator core 41 and the coils 50, so that the stator core 41 and the coils 50 are insulated from each other.

The insulator 51 has an annular portion 55, nine tooth portions 56 which are radially inwardly projected from an inner peripheral surface of the annular portion 55 and which are circumferentially arrayed, and a cylindrical-shaped wall section 57 erected in an axial end face of the annular portion 55.

The annular portion 55 of the insulator 51 is in opposition to and contact with the cylindrical portion 45 of the stator core 41, while the plurality of tooth portions 56 of the insulator 51 are in opposition to and contact with the plurality of tooth portions 46, respectively, of the stator core 41.

The tooth portions 46 of the stator core 41 and the tooth portions 56 of the insulator 51 are roughly similar in shape to each other, as viewed in the axial direction of the stator core 41.

Figure 3:
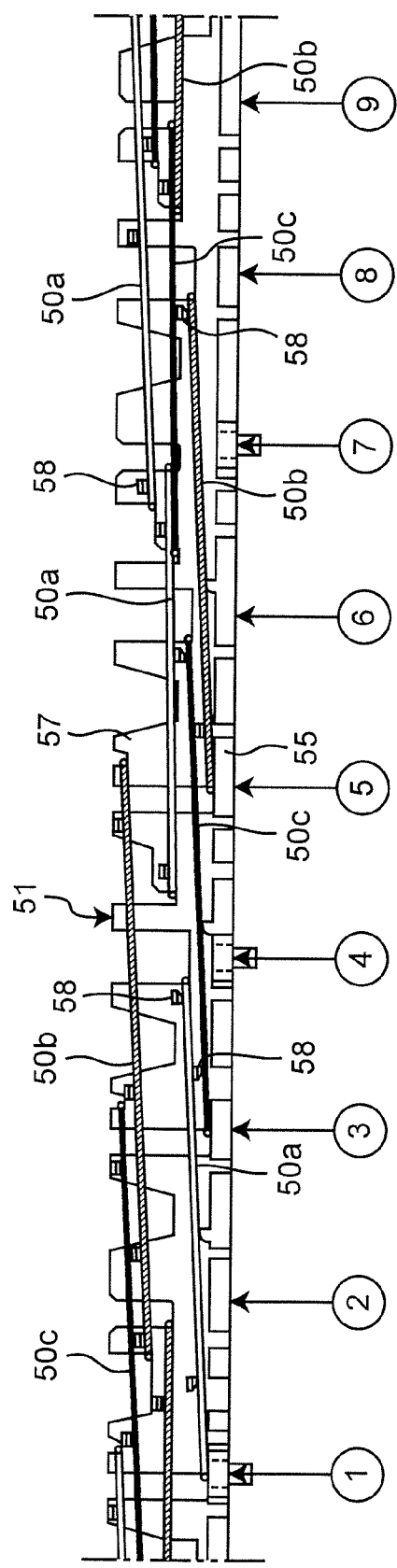
FIG. 3 is a developed view of an outer peripheral side of the insulator in a first embodiment of the stator of the invention.

As shown in FIG. 3, crossover wires 50a, 50b, 50c of the respective coils 50 are set creeping circumferentially on the outer peripheral surface of ,he wall section 57. FIG. 3 is a developed view of the outer peripheral side of the insulator 51.

The crossover wires 50a, 50b, 50c connect individual phases of the respective coils 50. Passed through the crossover wires 50a, 50b, 50c are three-phase currents of U phase, V phase and W phase, respectively. In FIG. 3, the crossover wire 50a of U phase is depicted by hollow lines, the crossover wire 50b of V phase is depicted by hatching, and the crossover wire 50c of W phase is depicted by filled lines. Circled numerals 1-9 denote positions of the tooth portions 46, respectively, where circled numerals 1, 4, 7 denote the tooth portions 46 of U phase, circled numeral 2, 5, 8 denote the tooth portions 46 of V phase, and circled numerals 3, 6, 9 denote the tooth portions 46 of W phase.

A plurality of protruding portions 58 for restricting axial movement of the crossover wires 50a, 50b, 50c are provided on the outer peripheral surface of the wall section 57. An interval between protruding portions 58 neighboring each other in a heightwise direction of the wall section 57 is not less than a wire diameter of the crossover wires 50a-50c. The wire diameter of the crossover wires 50a-50c is 0.5 mm-1.2 mm as an example.

Figure 4:
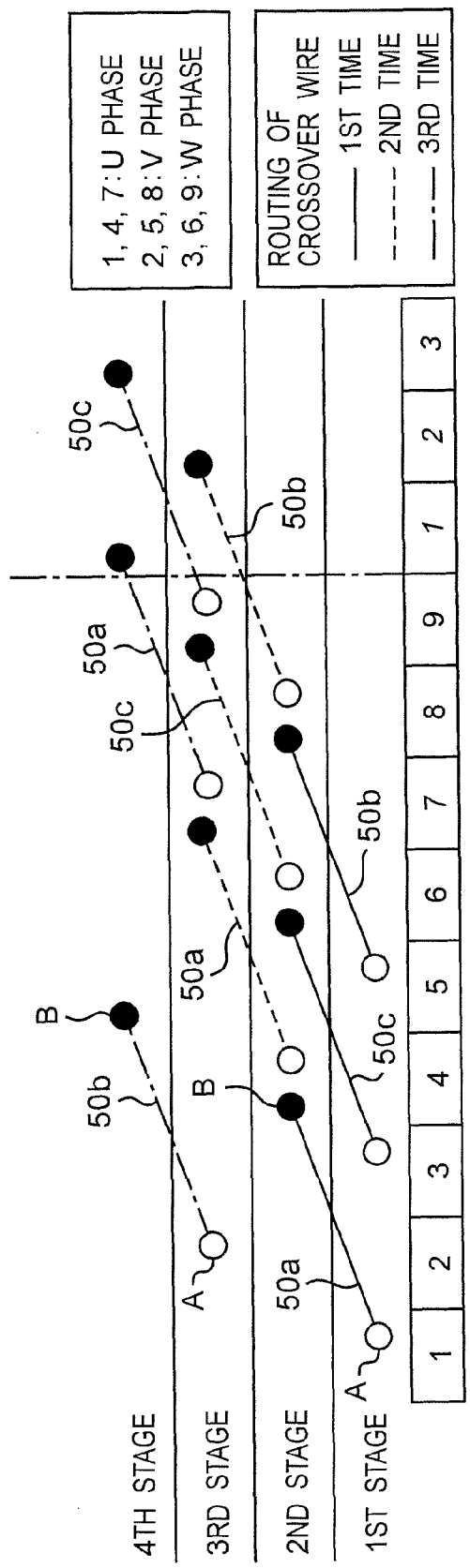
FIG. 4 is a schematic view for explaining the routing of the crossover wires.

As shown in FIGS. 3 and 4, the crossover wires 50a-50c are routed on the outer peripheral surface of the wall section 57 so as to extend obliquely to a plane orthogonal to an axis of the stator ("orthogonal-to-axis plane"), as viewed in the direction orthogonal to the axis ("orthogonal-to-axis direction"). FIG. 4 is a schematic view of FIG. 3. Framed numerals 1 to 9 in FIG. 4 correspond to circled numerals 1 to 9 of FIG. 3, respectively. Hereinafter, the tooth portions 46 denoted by the numerals 1 to 9 will be referred to as first to ninth tooth portions 46, respectively.

The wall section 57 has a plurality of stages in a heightwise direction, and the pull-out portions A and pull-in portions B of the crossover wires 50a-50c are positioned at mutually neighboring stages.

The pull-out portions A are portions of the crossover wires 50a-50c that are pulled out from the inner surface to the outer surface of the wall section 57 and that are indicated by open circles in FIG. 4.

The pull-in portions B are portions of the crossover wires 50a-50c that are pulled in from the outer surface to the inner surface of the wall section 57 and that are indicated by filled circles in FIG. 4.

The stages of the wall section 57 are segmented by the protruding portions 58, and an interval between the neighboring stages is not less than the wire diameter of the crossover wires 50a-50c.

The way of routing of the crossover wires 50a-50c will be explained below.

As shown in FIG. 4, winding of the coils is performed on three sets of neighboring slot portions simultaneously. That is, the coils are wound simultaneously on the first tooth portion 46 of U phase, the third tooth portion 46 of W phase, and the fifth tooth portion 46 of V phase.

Thereafter, from the first, third and fifth tooth portions 46, the coils are pulled out simultaneously at the first stage of the wall section as shown by the pull-out portions A. Thereafter, the crossover wires 50a-50c are routed simultaneously obliquely from the first stage to the second stage, as shown by solid line, and thereafter the coils are pulled in simultaneously at the second stage as shown by the pull-in portions B so that the crossover wires 50a-50c routed from the first, third and fifth tooth portions 46 lead to the fourth, sixth and eighth tooth portions 46, respectively.

Then, the coils are wound simultaneously on the fourth, sixth and eighth tooth portions 46. Thereafter, the crossover wires 50a-50c are routed so as to extend obliquely, and the coils are wound on all the tooth portions 46 similarly. In FIG. 4, with respect to the order of routing of the crossover wires 50a-50c, the first-time routing is shown by solid line, the second-time routing is shown by broken line, and the third-time routing is shown by one-dot chain line.

According to the stator 40 of the construction described above, the crossover wires 50a-50c of the coils 50 are routed on the outer peripheral surface of the wall section 57 of the insulator 51 so as to extend obliquely to the orthogonal-to-axis plane, as viewed in the orthogonal-to-axis direction. Therefore, during the winding of the coils 50 simultaneously on three sets of slot portions 47 of the stator core 41, with one set consisting of neighboring slot portions 47, when a plurality of crossover wires 50a-50c are routed on the wall section 57 so as not to make contact with one another, the height of the crossover wires 50a-50c from the annular portion 55 (or an end face of the stator core 41) can be made lower. Thus, the axial height of the wall section 57 can be reduced, so that the stator 40 can be made smaller-sized.

That is, as shown in FIG. 4, with oblique routing of the crossover wires 50a-50c, the height of the wall section 57 can consist of four stages in a case of a nine-slot stator.

Figure 5:
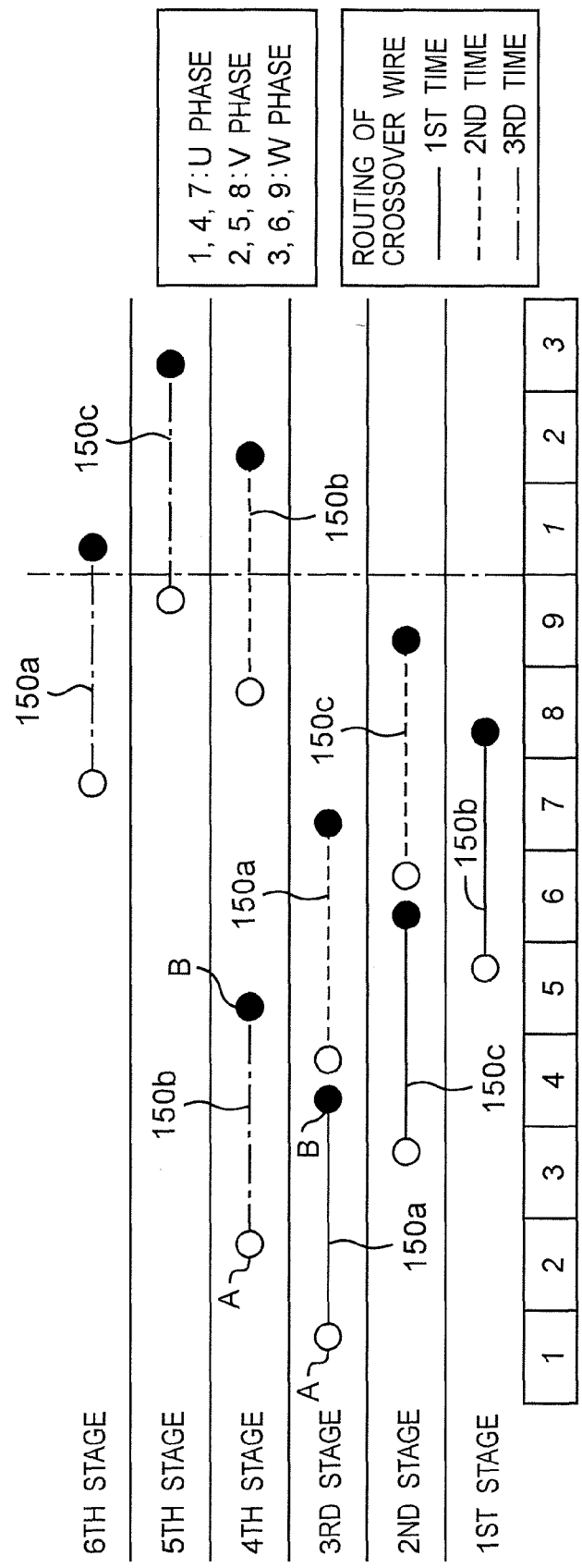
FIG. 5 is a schematic view for explaining the routing of the crossover wires in a comparative example of the stator.

In contrast to this, as shown in a comparative example of FIG. 5, during the winding of the coils simultaneously on three sets of slot portions, with one set consisting of neighboring slot portions, when a plurality of crossover wires 150a-150c are routed horizontally on the wall section of the insulator so as not to make contact with one another, the height of the crossover wires 150a-150c from the end face of the stator core is increased. Thus, with the crossover wires 150a-150c routed horizontally, the height of the wall section increases to six stages in the case of a 9-slot stator, causing a problem of size increase in the stator.

Also according to the stator 40 of the construction described above, the pull-out portions A and the pull-in portions B of the crossover wires 50a-50c are positioned at mutually neighboring stages, so that the axial height of the wall section 57 can be reduced even more.

According to the motor 3 of the construction described above, the above-described stator 40 is included.

Since the stator 40 can be made smaller-sized, the motor 3 can also be made smaller-sized.

According to the compressor of the construction described above, the above-described motor 3 is included. Since the motor 3 can be made smaller-sized, the compressor can also be made smaller-sized. That is, the distance between the motor 3 and the compression mechanism 2 can be made smaller, so that the overall height of the compressor can be made lower. As a result, the rigidity of the compressor can be improved, so that operating noise of the compressor can be reduced.

(Second Embodiment)

Figure 6:
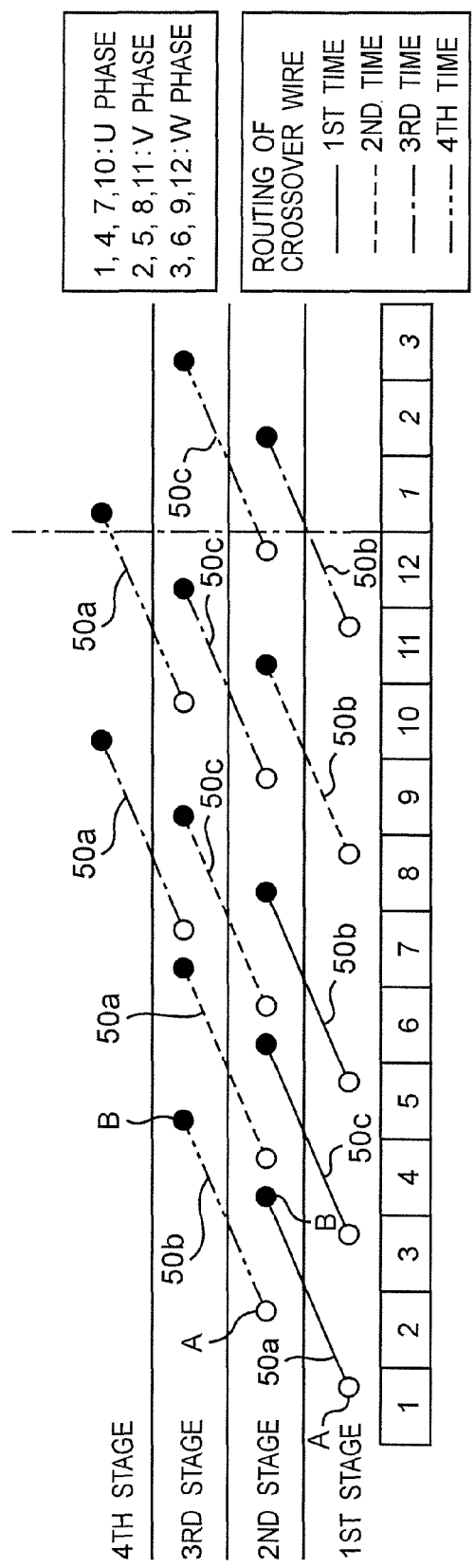
FIG. 6 is a schematic view for explaining the routing of the crossover wires in a second embodiment of the stator of the invention.

FIG. 6 shows a second embodiment of the stator of the invention. This second embodiment differs from the first embodiment (FIG. 4) in the quantity of tooth portions (slot portions) of the stator core. Since the rest of the structure is similar to that of the first embodiment, its description is omitted.

As shown in FIG. 6, this second embodiment shows a routing state of the crossover wires 50a-50c in a case of a 12-slot stator. With respect to the order of routing of the crossover wires 50a-50c, the first-time routing is shown by solid line, the second-time routing is shown by broken line, the third-time routing is shown by one-dot chain line, and the fourth-time routing is shown by two-dot chain line. The way of routing of the crossover wires 50a-50c is similar to that of the first embodiment.

Therefore, during the winding of the coils simultaneously on three sets of slot portions with neighboring slot portions constituting one set, because a plurality of crossover wires 50a-50c are routed obliquely, the height of the insulator wall section can be made as low as four stages.

Figure 7:
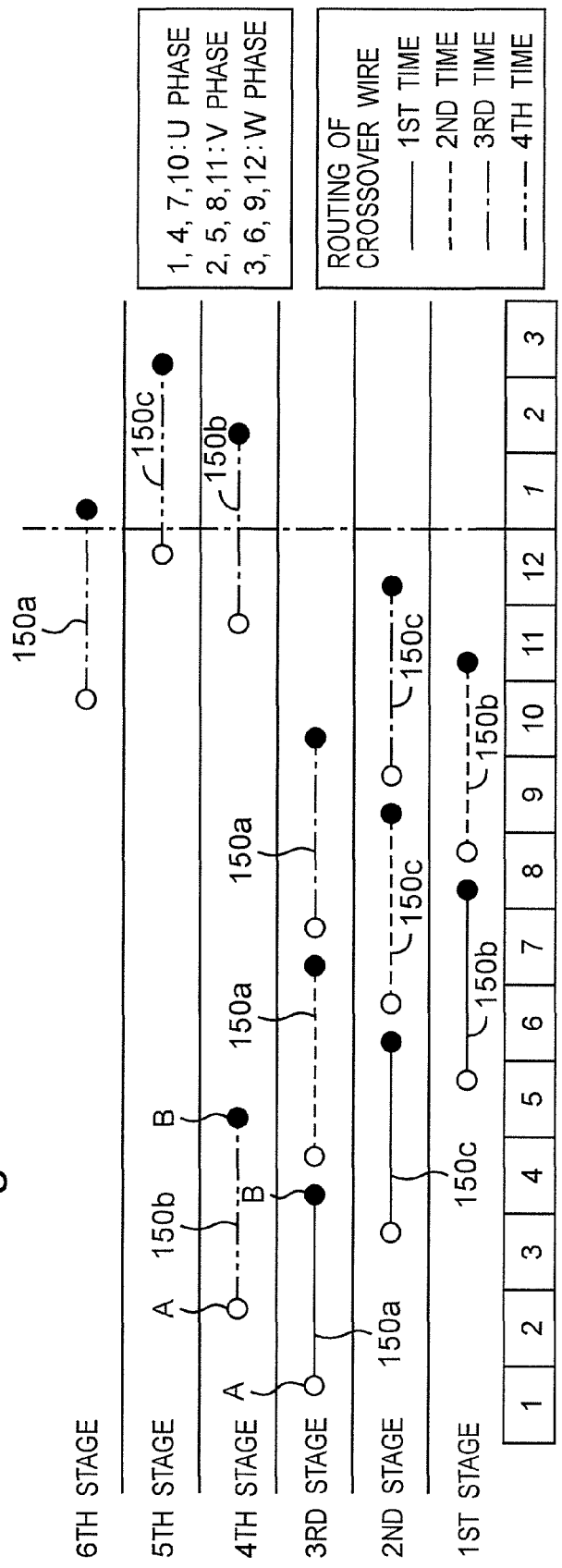
FIG. 7 is a schematic view for explaining the routing of the crossover wires in a comparative example of the stator.

In contrast to this, when the crossover wires 150a-150c are routed horizontally as shown in the comparative example of FIG. 7, the height of the insulator wall section increases as high as six stages.

(Third Embodiment)

Figure 8:
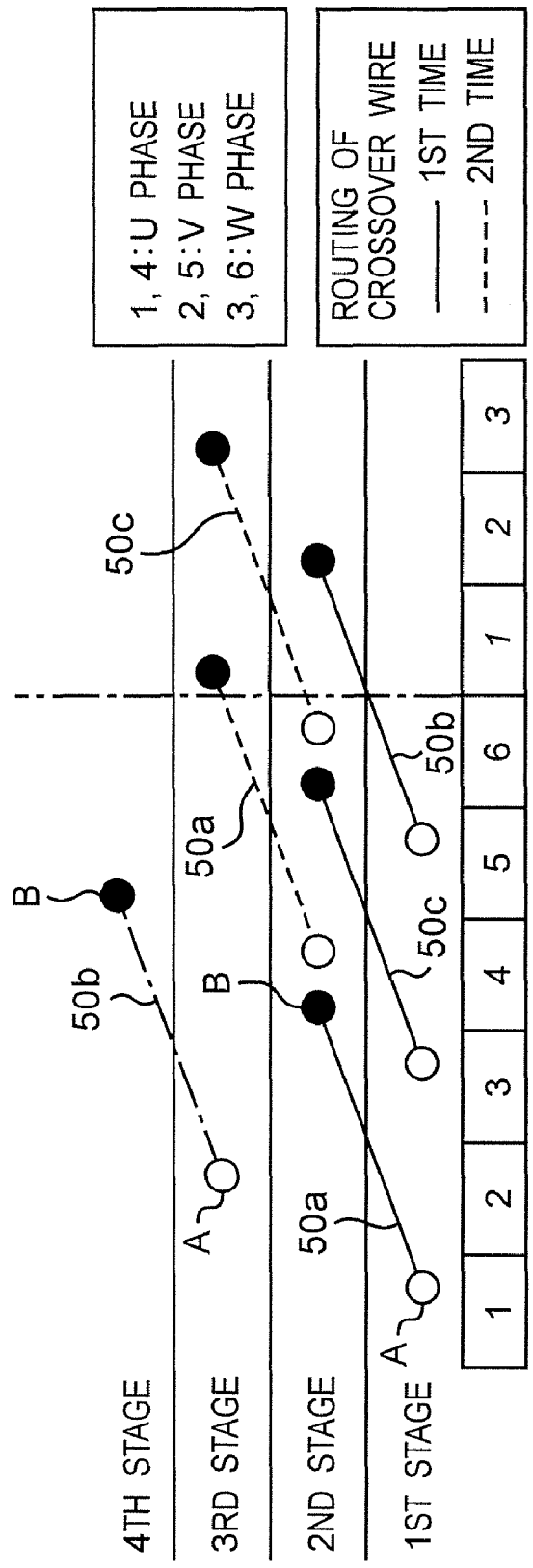
FIG. 8 is a schematic view for explaining the routing of the crossover wires in a third embodiment of the stator of the invention.

FIG. 8 shows a third embodiment of the stator of the invention. As to its differences from the first embodiment (FIG. 4), the third embodiment differs in the quantity of the tooth portions (slot portions) of the stator core. It is noted that the rest of the structure is similar to that of the first embodiment, its description being omitted.

As shown in FIG. 8, this third embodiment shows a routing state of the crossover wires 50a-50c in a case of a 6-slot stator. With respect to the order of routing of the crossover wires 50a-50c, the first-time routing is shown by solid line, and the second-time routing is shown by broken line. The way of routing of the crossover wires 50a-50c is similar to that of the first embodiment.

Therefore, during the winding of the coil simultaneously on three sets of slot portions with neighboring slot portions constituting one set, because a plurality of crossover wires 50a-50c are routed obliquely, the height of the insulator wall section can be made as low as three stages.

Figure 9:
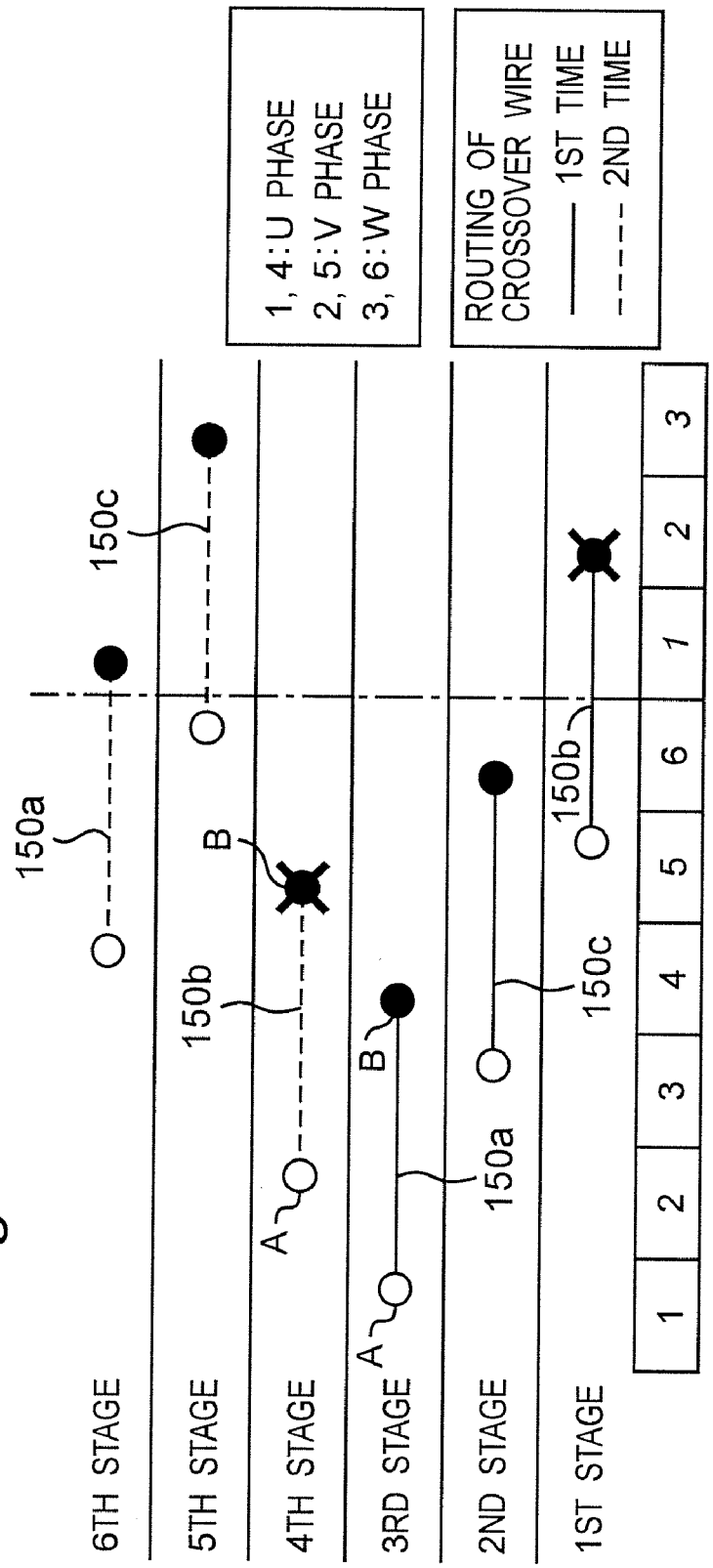
FIG. 9 is a schematic view for explaining the routing of the crossover wires in a comparative example of the stator.

In contrast to this, when the crossover wires 150a-150c are routed horizontally as shown in the comparative example of FIG. 9, it is impossible to route the crossover wires 150a-150c even if the height of the insulator wall section is made as high as six stages. That is, as indicated by x marks in FIG. 9, the pull-in portions B of the crossover wire 150b of V phase in the first-time routing and the crossover wire 150b of V phase in the second-time routing make contact with other crossover wires.

It is noted that this invention is not limited to the above-described embodiments. For instance, the compression mechanism may be provided as not only a rotor type one but also a scroll type or reciprocating type one. Further, the quantity of the tooth portions (slot portions) of the stator core may freely be increased or decreased.

What is claimed is:

1. A stator comprising:
a stator core;
an insulator fitted on an axial end face of the stator core; and
coils wound around the stator core and the insulator,
the insulator having
an annular portion,
a plurality of circumferentially arranged tooth portions projecting radially inwardly from an inner peripheral surface of the annular portion, and
a cylindrical-shaped wall section erected on an axial end face of the annular portion such that the wall section axially extends, and
the coils including crossover wires routed on an outer peripheral surface of the wall section of the insulator so as to extend obliquely relative to a plane orthogonal to an axis of the stator, as viewed in a direction orthogonal to the axis, and
the wall section of the insulator having at least first, second and third stages in different axial positions of the wall section, the at least first, second and third stages extending in a circumferential direction of the wall section, and
at least one of the crossover wires including
at least first and second pull-out portions pulled out from an inner surface to an outer surface of the wall section, and
at least first and second pull-in portions pulled in from the outer surface to the inner surface of the wall section, the first and second pull-out portions corresponding to the first and second pull-in portions, respectively,
with the first pull-out portion positioned in the first stage the first pull-in portion and the second pull-out portion positioned in the second stage next to the first stage, and the second pull-in portion positioned in the third stage next to the second stage.

2. A motor comprising:
a rotor; and
a stator placed so as to surround an outer peripheral side of the rotor, the stator including
a stator core;
an insulator fitted on an axial end face of the stator core; and
coils wound around the stator core and the insulator,
the insulator having
an annular portion,
a plurality of circumferentially arranged tooth portions projecting radially inwardly from an inner peripheral surface of the annular portion, and
a cylindrical-shaped wall section erected on an axial end face of the annular portion such that the wall section axially extends, and
the coils including crossover wires routed on an outer peripheral surface of the wall section of the insulator so as to extend obliquely relative to a plane orthogonal to an axis of the stator, as viewed in a direction orthogonal to the axis, and
the wall section of the insulator having at least first, second and third stages in different axial positions of the wall section, the at least first, second and third stages extending in a circumferential direction of the wall section, and
at least one of the crossover wires including
at least first and second pull-out portions pulled out from an inner surface to an outer surface of the wall section, and
at least first and second pull-in portions pulled in from the outer surface to the inner surface of the wall section, the first and second pull-out portions corresponding to the first and second pull-in portions, respectively,
with the first pull-out portion positioned in the first stage, the first pull-in portion and the second pull-out portion positioned in the second stage next e first stage, and the second pull-in portion positioned in the third stage next to the second stage.

3. A compressor comprising:
a closed container;
a compression mechanism placed within the closed container; and
a motor placed within the closed container to drive the compression mechanism, the motor including a rotor, and a stator placed so as to surround an outer peripheral side of the rotor,
the stator including
a stator core;
an insulator fitted on an axial end face of the stator core; and
coils wound around the stator core and the insulator,
the insulator having
an annular portion,
a plurality of circumferentially arranged tooth portions projecting radially inwardly from an inner peripheral surface of the annular portion, and a cylindrical-shaped wall section erected on an axial end face of the annular portion such that the wall section axially extends, and the coils including crossover wires routed on an outer peripheral surface of the wall section of the insulator so as to extend obliquely relative to a plane orthogonal to an axis of the stator, as viewed in a direction orthogonal to the axis, and the wall section of the insulator having at least first, second and third stages in different axial positions of the wall section, the at least first, second and third stages extending in a circumferential direction of the wall section, and at least one of the crossover wires including
- at least first and second pull-out portions pulled out from an inner surface to an outer surface of the wall section, and
- at least first and second pull-in portions pulled in from the outer surface to the inner surface of the wall section, the first and second pull-out portions corresponding to the first and second pull-in portions, respectively, with the first pull-out portion positioned in the first stage, the first pull-in portion and the second pull-out portion positioned in the second stage next to the first stage, and the second pull-in portion positioned in the third stage next to the second stage.

4. The stator according to claim 1, wherein
at least two lead out wires are disposed at different inclinations relative to each other on the outer surface of the cylindrical shaped wall section.

5. The motor according to claim 2, wherein
at least two lead out wires are disposed at different inclinations relative to each other on e outer surface of the cylindrical shaped wall section.

6. The compressor according to claim 3, wherein
at least two lead out wires are disposed at different inclinations relative to each other on the outer surface of the cylindrical shaped wall section.

* * * * *